Feb. 8, 1927.

W. I. TWOMBLY 1,616,519

CONTROL FOR REGULATING TEMPERATURES

Filed May 26, 1922     2 Sheets-Sheet 1

Feb. 8, 1927.
W. I. TWOMBLY
1,616,519
CONTROL FOR REGULATING TEMPERATURES
Filed May 26, 1922
2 Sheets-Sheet 2
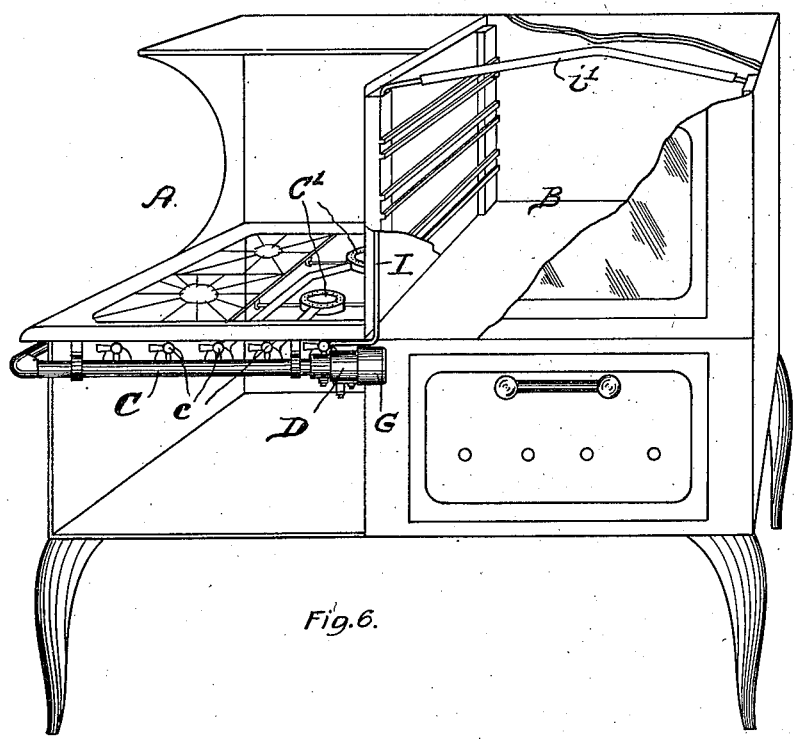
Fig.6.
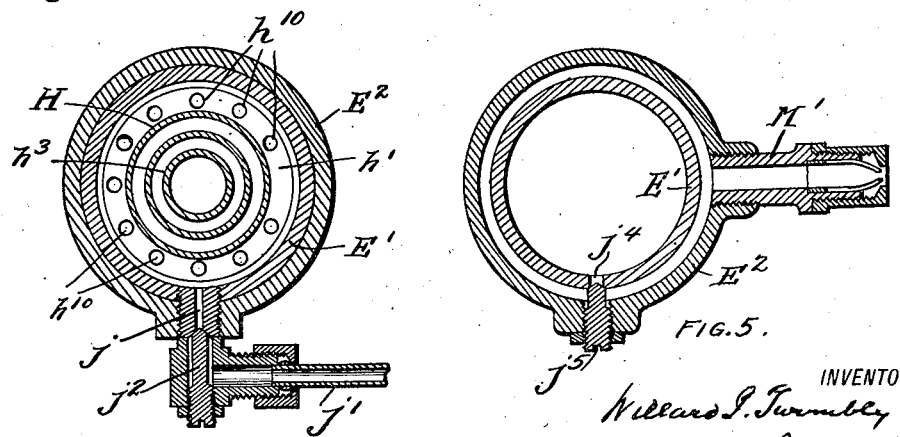
FIG.4.
FIG.5.
INVENTOR
Willard I. Twombly
BY
His ATTORNEY Patented Feb. 8, 1927.

1,616,519

UNITED STATES PATENT OFFICE.

WILLARD I. TWOMBLY, OF NEW YORK, N. Y., ASSIGNOR, BY MESNE ASSIGNMENTS, TO THE WILCOLATOR COMPANY, OF NEWARK, NEW JERSEY, A CORPORATION OF DELAWARE.

CONTROL FOR REGULATING TEMPERATURES.

Application filed May 26, 1922. Serial No. 563,769.

This invention relates to controls for regulating temperatures, and has to do more particularly with a control mechanism by which variations in temperature are used to control the flow of the fuel which is burned to produce this temperature. The device is of the type frequently employed in gas stoves, and provides automatic means for regulating the temperature of the oven by the control of the gas fed to the burners which heat the oven.

The object of the invention is to provide a simple device of the type described which may readily be installed on stoves now in operation, and which is simple in construction and so arranged that all the working parts are fully protected. At the same time the device is constructed so that it is easily operated and may readily be dismantled, should occasion arise, for purposes of cleaning or adjustment.

The mechanism includes a bulb which is placed in the oven, the temperature of which is to be controlled, this bulb containing an inert fluid. The bulb is connected to an expansible chamber or bellows which carries the moving element of a valve through which flows the gas consumed in the burners heating the oven. A rise in temperature in the oven which brings about an expansion of the inert fluid and in turn an expansion of the bellows, causes the valve to close so as to cut off the supply of fuel to the burners, but included in the device is a bypass through which gas for a pilot light may pass, and a second by-pass is also provided which supplies a sufficient amount of gas so that gas will be continuously fed to the burners to maintain any selected temperature at which the main valve would be closed. The mechanism also includes various other features which will be described in detail hereafter.

For a better understanding of the invention, reference may be had to the accompanying drawings, in which—

Figure 1:
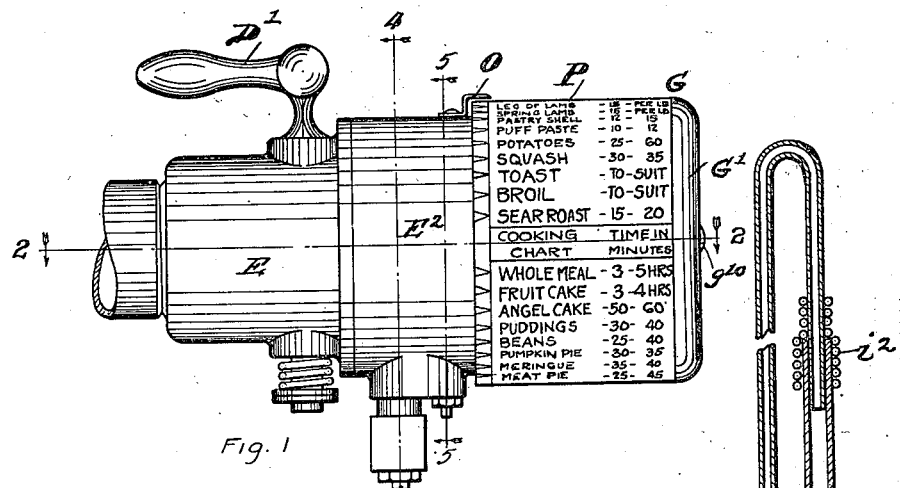
Fig. 1 is a view in elevation of a device embodying the invention.

Figs. 4 and 5 are vertical sectional views on the lines 4—4 and 5—5 respectively of Fig. 1, and Fig. 6 is a perspective view of a gas stove showing the control mechanism disposed thereon.

Figure 2:
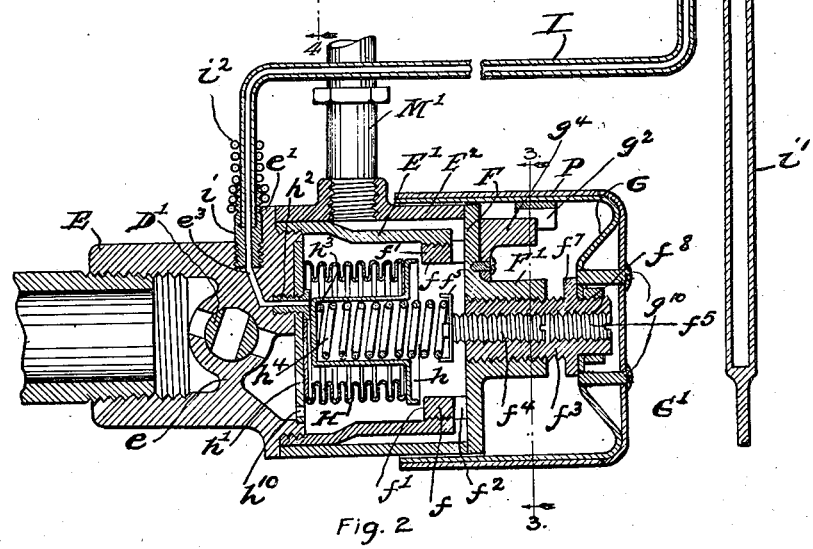
Fig. 2 is a cross-sectional view of the device taken on the line 2—2 of Fig. 1.

Referring more particularly to Figs. 1, 2, 3, 5 and 6. E designates a casing adapted at one end for connection with a gas supply. The casing E is provided with a partition $e$ in which a valve or cock $D^1$ is mounted to control the flow of gas from the supply to the casing E. $E^1$ designates a cylinder which as shown is threaded onto the end of the casing E. Surrounding the cylinder $E^1$ is a casing $E^2$ one end of which bears against a shoulder $e^1$ formed on the casing E. The casing $E^2$ is held in position by means of a plate F, the outer portion of which engages the end of the casing $E^2$ as shown in Fig. 2. The plate F is provided with a collar $f$ the exterior of which is screw threaded at its end portion to engage a screw thread provided on the interior wall of the clyinder $E^1$. The end portion $f^1$ of the collar $f$ constitutes a seat for a valve $h$ to be hereinafter described. It will be observed that the cylinder $E^1$ is so shaped as to provide for an annular chamber between it and the casing $E^2$, the end of which is closed by the plate F. Communication between the interior of the cylinder $E^1$ and said chamber is afforded by openings $f^2$ formed in the wall of the collar $f$.

Located within the cylinder $E^1$ is a bellows H preferably of copper. It is sealed to a plate $h^1$ which is pressed into a recess provided for it in the end of the casing E, and which has a peripheral opening $h^{10}$ through which gas passes into the cylinder $E^1$. A nipple $h^2$ extends through the plate $h^1$ and is threaded to fit in an opening provided for it in the end of the casing E. The nipple $h^2$ is provided with an orifice of small diameter which communicates with a passage $e^3$ formed in the casing E and with the interior of the bellows H. I designates a tube preferably of flexible material and having a bore not to exceed 35/1000 of an inch. One end of the tube is connected with the casing E through a connection $i$ and which latter has an orifice corresponding in diameter with the bore of the tube I. The connection $i$ is in communication with the passage $e^3$ also having a diameter preferably that of the tube I. The other end of the tube I terminates in a bulb $i^1$ here shown as being elongated, and which is intended to be placed in a medium the temperature of which it is desired to control. If desired a protective cover $i^2$, as for example a coiled spring, may surround the tube I.

The bellows H carries the valve $h$ sealed therewith and the valve $h$ coacts with the seat $f^1$. As here shown the valve is provided with a cylindrical portion $h^3$ which extends into the bellows H. Located within the cylindrical portion $h^3$ is a spring $h^4$ the tension of which may be regulated or adjusted. The plate F is provided with a centrally arranged collar $F^1$ in which a screw threaded plug $f^3$ works. The plug $f^3$ has an interior thread which coacts with an adjusting screw $f^4$. The screw $f^4$ carries a cap $f^5$ and the spiral spring $h^4$ is confined between it and the end of the cylinder $h^3$. The purpose of the screw $f^4$ is to regulate or adjust the tension of the spring $h^4$. Initially the tension of the spring $h^4$ is adjusted by the screw $f^4$ holding the valve $h$ from off its seat at a fixed low temperature say for example, 250 degrees F. In this position gas can flow past the valve $h$ to the burner to maintain that temperature. Thereafter the tension of the spring $h^4$ is adjusted or regulated by the plug $f^3$ the exterior screw thread of which has a pitch so that one complete revolution of the plug will provide for all temperatures for which the control is designed. A second screw $f^5$ is also carried by the plug $f^3$ for the purpose of concealing the adjusting screw $f^4$. A regulator or regulating handle G is carried by the plug $f^3$, and as here shown it is cup shaped. The plug $f^3$ extends through an opening in the end wall of the regulator and the latter is confined between a collar $f^7$, carried by the plug, and a nut $f^8$. This connection may be concealed by means of a plate $G^1$ which is connected with the regulator by means of screws $g^{10}$. When the regulator G is turned in either direction the plug $f^3$ is caused to move in and out of the collar $F^1$ to adjust the tension of the spring $h^4$ to move the valve away from or toward the seat $f^1$. The amount of movement of the regulator G in adjusting the control, is limited by means of a projection $g^2$ (Figs. 2, 3) coacting with a stop $g^4$ carried by the plate F. It will be observed that when the regulator G is moved beyond the limits required for adjusting the control, that the co-action of the stops $g^2$ and $g^4$ may be used to screw and unscrew the collar $f$ from the end of the cylinder $E^1$. When the plate F and collar $f$ are separated from the cylinder $E^1$ the interior of the cylinder is exposed and may be easily cleaned, as well as the valve seat $f^1$ on the collar $f$. Preferably the spring $h^4$ is tightly fitted within the cylinder $h^3$ so that when the plate F is removed the spring $h^4$ remains in position.

An inert gas, for example nitrogen is hermetically sealed within the bellows H, the capillary tube I and bulb $i^1$, at atmospheric pressure or a greater pressure so that the pressure of the gas will not vary except under temperature changes. Normally the valve $h^1$ is held off its seat by the spring $h^4$, at the lowest temperature for which the control is designed. When this temperature is reached the pressure of the gas within the bulb $i^1$, tube I and bellows H is raised so that it will distend the bellows H against the action of the spring $h^4$ to seat the valve $h$. In practice it is necessary that the pressure of the inert gas shall not be affected by any temperature except that of the medium which it is desired to control, and therefore it becomes necessary to maintain the bellows H at a nearly constant temperature. In order to do this I pass the gas for the burner around the outside of the bellows H and as much gas has a nearly constant temperature, the temperature of the inert gas within the bellows is maintained at the same temperature. As the internal diameter of the tube I is very small in relation to the diameter of the bellows H, any change in temperature of the inert gas within it produces only a negligible change in pressure in the bellows H.

Referring now to Figs. 5 and 6. In order to maintain a gas supply for a pilot light, I provide a passage $j$ from within the cylinder $E^1$ to a connection $j^1$ which leads to the pilot flame. A needle valve $j^2$ is provided to regulate the flow of gas to the pilot light. In order to provide for a flow of gas to the burner other than past the valve $h$ I provide a by-pass $j^4$ in the wall of the cylinder $E^1$ which is controlled by a needle valve $j^5$. This by-pass is necessary to maintain the lowest temperature for which the device is designed.

Figure 3:
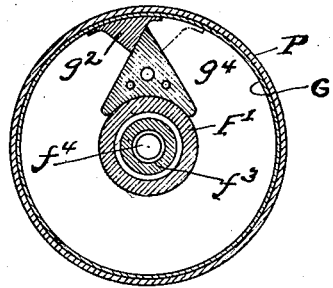
Fig. 3 is a vertical sectional view on the line 3—3 of Fig. 2.

The operation of the control is as follows, it being assumed that it is to be used to control temperatures from 250 degrees F. to 550 degrees F. In Figs. 1, 2 and 3 the device is shown in position to produce a temperature of 250° F. In this position of the parts when the valve or cock $D^1$ is opened, gas will flow past the cock $D^1$, through the openings $h^{10}$ into the cylinder $E^1$, around the bellows H and past the valve $h$ through the openings $f^2$ into the chamber between the cylinder $E^1$ and casing $E^2$. The gas passes from this chamber through a connection $M^1$ to the burner.

When the temperature caused by the heat of the burner reaches 250 degrees F., the pressure of the gas in the bulb $i^1$ (which is directly subjected to the temperature from the burner), tube I and bellows H is raised, thereby overcoming the tension of the spring $h^4$ whereupon the valve $h$ is closed upon its seat $f^1$. Further flow of gas to the burner except through the by-pass $j^4$ is therefore stopped. When the control is set to maintain a higher temperature, the regulator G is turned (a suitable scale being provided for that purpose as well as a pointer O carried by the casing $E^2$) thereby increasing the tension of the spring $h^4$. As the pressure of the gas in the tube I and bellows H gradually increases. the valve $h$ is moved towards its seat, until the pressure produced by the set temperature is reached, at which time the further flow of gas past the valve $h$ is cut off.

In Fig. 8, I have shown an application of the control shown in Figs. 1 and 2, to the oven of a gas stove. A designates a gas stove, and B the oven thereof. The stove A is provided with the usual manifold C at the front thereof and which is connected with a gas supply. The burners $C^1$ are supplied with gas through the usual valved connections $c$. At the end of the manifold adjacent the oven B, is located the control which I have designated D, which is connected to the burner or burners (not shown) for the oven $B^1$. The bulb $i^1$ of the tube I is placed in the oven at any desired point, and suitably supported therein, the tube I extending therefrom (and as shown) through the air space provided at the front of the oven, to the control D. The regulator G is the same as illustrated in the other figures, or it may only be provided with the usual scale indicating different temperatures.

By turning the regulator G under the pointer O the control may be set for any desired temperature above that for which the control was originally adjusted. The extreme high and low temperatures are limited by the engagement of the stop $g^2$ with the opposite sides of the stop $g^4$.

What I claim as my invention is:

1. In a control for the regulation of temperature, the combination of a bulb subjected to the temperature to be controlled, a bellows connected with said bulb and containing an inert fluid, a casing in which the bellows is mounted, a gas inlet in the casing near one end of the bellows, a gas outlet in the casing near the other end of the bellows, and a valve within the casing for controlling the flow of gas therethrough directly operated by said bellows.

2. In a control for regulating temperatures, the combination with a casing connected with a gas supply; a cylinder connected with said casing and communicating with the casing; a second casing enclosing the cylinder and with the cylinder forming a chamber; a gas burner connected with said chamber; a plate closing the end of the cylinder and said chamber; a bellows within the cylinder and containing an inert gas; a bulb connected therewith; a valve operated by said bellows; and a seat for said valve and coöperating therewith to control the flow of gas from the cylinder to the chamber.

3. In a control for regulating temperatures, the combination with a cylinder connected with a gas supply; a casing surrounding the cylinder and with it forming a chamber; a plate having a screw threaded engagement with the end of said cylinder for closing the end of said cylinder and said chamber; a valve seat carried by said plate and past which gas flows from the cylinder to said chamber; a bellows within the cylinder and containing an inert gas; a bulb connected with said bellows and subjected to the temperature to be controlled; and a valve operated by said bellows and co-operating with said seat to control the flow of gas past it.

4. In a control for regulating temperatures, the combination with a cylinder connected with a gas supply; a casing surrounding the cylinder, and with it forming a chamber which is in communication with said cylinder; a plate having a screw threaded engagement with the end of said cylinder for closing the end of the cylinder and said chamber; a bellows within the cylinder and containing an inert gas; a bulb connected with said bellows and subjected to the temperature to be controlled; a valve operated by said bellows; a seat carried by said plate and coacting with the valve to control the supply of gas from the cylinder to said chamber; a spring acting to hold the valve from its seat; and means carried by the plate for regulating the tension of said spring.

5. In a control for regulating temperatures, the combination with a cylinder connected with a gas supply; a casing surrounding the cylinder, and with it forming a chamber which is in communication with said cylinder; a plate having a screw threaded engagement with the end of said cylinder for closing the end of the cylinder and said chamber; a bellows within the cylinder and containing an inert gas; a bulb connected with said bellows and subjected to the temperature to be controlled; a valve operated by said bellows; a seat carried by said plate and coacting with the valve to control the supply of gas from the cylinder to said chamber; a spring acting to hold the valve from its seat; means for adjusting the initial tension of said spring; and means for thereafter adjusting the tension of the spring for different temperatures.

6. In a control for regulating temperatures, the combination of a bulb subjected to the temperature to be controlled, a bellows connected with said bulb and containing an inert fluid, a casing in which the bellows is mounted, a gas inlet in the casing, a gas outlet in the casing, the inlet and the outlet being disposed near opposite ends of the bellows in such manner that the flow of gas from inlet to outlet is past the bellows, a valve within the casing directly operated by said bellows, the said valve controlling the flow of gas through the outlet, and a second gas outlet from the casing continuously open regardless of the position of said valve.

7. In a control for regulating temperatures, the combination of a bulb subjected to the temperature to be controlled, a bellows connected with said bulb and containing an inert fluid, a casing in which the bellows is mounted, a gas inlet in the casing, a gas outlet in the casing the inlet and outlet being disposed near opposite ends of the bellows, a valve directly operated by said bellows and controlling the flow of gas through the said outlet, and a pair of gas outlets from the casing, which are continuously open regardless of the position of said valve, one of these outlets being connected to the gas outlet first mentioned from the casing.

8. In a control for regulating temperatures, the combination of a bulb subjected to the temperature to be controlled, a bellows connected with said bulb and containing an inert fluid, a casing in which the bellows is mounted, a gas inlet in the casing, a gas outlet in the casing the inlet and outlet being disposed near opposite ends of the bellows, a valve directly operated by said bellows and controlling the flow of gas through the said outlet, a pair of gas outlets from the casing, and control means for controlling the flow of gas through each of these outlets.

9. In a control for regulating temperatures, the combination of a bulb subjected to the temperature to be controlled, a bellows connected with said bulb and containing an inert fluid, a casing surrounding the bellows, the latter having one end fixed within the casing, a gas inlet in the casing, a gas outlet in the casing the inlet and outlet being disposed near opposite ends of the bellows, a valve seat encircling the gas outlet, and a movable valve member carried on the free end of the bellows and adapted to close the valve upon the expansion of the bellows.

10. In a control for regulating temperatures, the combination of a bulb subjected to the temperature to be controlled, a bellows connected to the bulb and containing an inert fluid, a casing in which the bellows is mounted, the bellows having a fixed end and a free end, a gas inlet in the casing, a gas outlet in the casing the inlet and outlet being disposed near opposite ends of the bellows, a valve seat encircling the gas outlet a valve member carried on the free end of the bellows and adapted, upon the expansion of the latter, to bear against the seat to close the outlet, and a spring resisting the expansion movement of the bellows.

11. In a control for regulating temperatures, the combination of a bulb subjected to the temperature to be controlled, a bellows connected to the bulb and containing in inert fluid, a casing in which the bellows is mounted, the bellows having a fixed end and a free end, a gas inlet in the casing, a gas outlet in the casing the inlet and outlet being disposed near opposite ends of the bellows, a valve seat encircling the gas outlet, a valve member carried on the free end of the bellows and adapted, upon the expansion of the latter, to bear against the seat to close the outlet, a spring resisting the expansion movement of the bellows, and means operable from without the casing to alter the tension of the spring.

12. In a control for regulating temperatures, the combination of a bulb subjected to the temperature to be controlled, a bellows connected to the bulb and containing an inert fluid, a casing in which the bellows is mounted, the bellows having a fixed end and a free end, a gas inlet in the casing, a gas outlet in the casing, a valve seat encircling the gas outlet, a valve member carried on the free end of the bellows and adapted, upon the expansion of the latter, to bear against the seat to close the outlet, a spring resisting the expansion movement of the bellows, means for setting the tension of the spring initially, and means operable from without the casing for varying the position of the setting means to vary the temperature at which the valve is operated.

WILLARD I. TWOMBLY.